Patented Aug. 12, 1924.

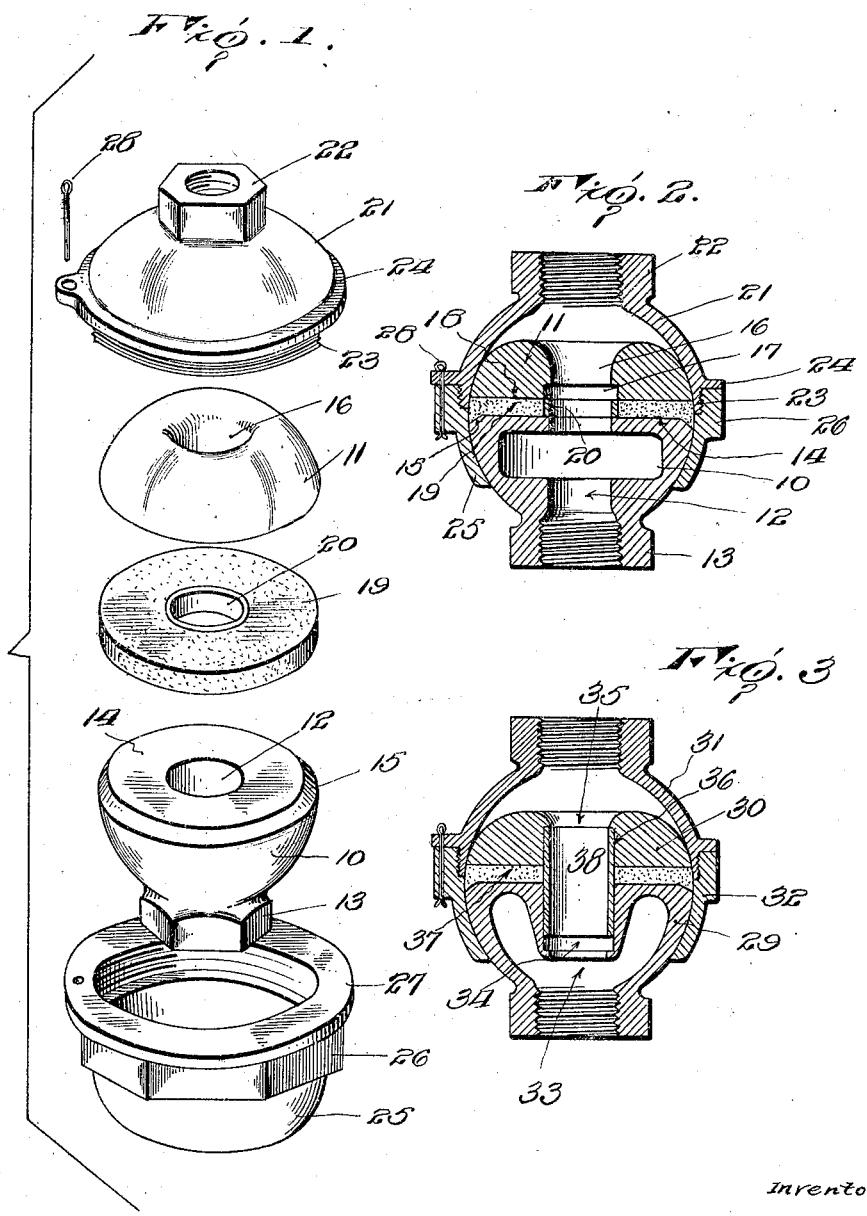

1,504,662

UNITED STATES PATENT OFFICE.

WALTER C. WHITE, OF PITTSBURGH, PENNSYLVANIA, ASSIGNOR TO INTERNATIONAL COUPLERS CO., A CORPORATION OF CALIFORNIA.

FLEXIBLE PIPE JOINT.

Application filed July 31, 1919. Serial No. 314,506.

*To all whom it may concern:*

Be it known that I, WALTER C. WHITE, citizen of the United States, residing at Pittsburgh, in the county of Allegheny and State of Pennsylvania, have invented certain new and useful Improvements in Flexible Pipe Joints, of which the following is a specification.

This invention relates to an improved flexible pipe joint especially designed for use in connection with fluid pressure systems and has as one of its principal objects to provide a metallic joint which will be dependably free of all leakage.

The invention has as a further object to provide an improved type of packing and wherein the joint will be so constructed that the packing may be readily arranged in position within the joint.

A further object of the invention in this connection is to provide a packing which may be either compressible or subject to swelling due to liquid absorption or may possess both of these properties and wherein the packing will be equipped with a rigid core adapted to prevent either the compression or expansion of the packing to restrict or close the fluid passage therethrough.

And the invention has as a still further object to provide a packing wherein the core thereof may be embodied in the construction of the packing at the time of its original manufacture or wherein, if preferred, the packing and core may be constructed separately and assembled at the time the packing is placed within the joint.

Other and incidental objects will appear hereinafter.

In the drawings:

Figure 1 is a perspective view showing my improved joint disassembled, the parts, however, being in proper relative position, Figure 2 is a sectional view showing the joint assembled, and Figure 3 is a sectional view illustrating a modification of the invention.

Referring now more particularly to the drawings, it will be seen that the joint of the present invention is of the ball and socket type. The ball is of sectional construction and includes a substantially hemispherical body section 10 with which coacts a cap section 11 conforming to the spherical contour of the body section. Formed through the body section is a fluid passage 12 at one end of which said section is formed with a pipe nipple 13. At the opposite end of said passage the body section is formed with a flat face 14 surrounded by an annular beveled face or shoulder 15 at the periphery of the section. Formed through the section 11 of the ball to register with the passage 12 is a passage 16 flared toward its outer end. The inner end portion of said passage is counterbored to provide a recess or socket 17 opening upon a flat face 18 provided upon the section to confront the face 14 of the body section 10. The passages 12 and 16 are, as will be observed, arranged at substantially right angles to these flat faces.

Removably fitted between the sections 10 and 11 of the ball and engaged by the flat faces 14 and 18 thereof is a packing or gasket indicated as a whole at 19 and which is of a thickness to complete the spherical shape of the ball, the packing at its outer edge conforming to the spherical outline of the ball. As particularly illustrated in Figure 1, the body of this packing is formed in the shape of a ring which surrounds an annular non-yielding core 20 about which the body tightly fits. The core 20 is preferably constructed of metal and, as particularly brought out in Figure 2, is of a length conforming to the thickness of the packing body. The packing body may be constructed of any approved material but in any event is either alone compressible or is compressible and also subject to swelling due to liquid absorption. In some instances it may be desired to employ a packing which is only compressible while under other circumstances a packing which is compressible and also subject to swelling will be found advantageous. In the present instance I employ a packing of the latter character and it is now to be observed that the core 20 may be embedded in the packing as a component part thereof at the time the packing is originally manufactured while, if preferred, the core and packing body may be later assembled when the packing is brought into actual use. As particularly illustrated in Figure 2, the core 20 is of an internal diameter corresponding to the diameter of the passages 12 and 16 respectively and registers therewith, while the body of the packing extends to the periphery of the ball and overlies the shoulder 15. In this connection, it will be noted that the socket or recess 17 is of a diameter corresponding to the external diameter of the core.

Coacting with the ball is a socket therefor. This socket includes a socket cup 21 provided with a pipe nipple 22 corresponding to the nipple 13 of the ball and formed on the cup is an annular flange 23 at the inner end of which is arranged a stop shoulder 24. Threaded upon the flange 23 is an annular socket nut 25 conforming in contour to the contour of the cup and provided with a wrench receiving enlargement 26 surmounted by a flange 27 abutting the shoulder 24. Removably engaged through this shoulder, the flange 27, and the wrench receiving enlargement of the nut is a key 28 locking the nut and cap together. The inner faces of the cup and nut are machined to snugly engage the ball so that a close fitting contact will be had between the ball and socket.

As will now be observed, the section 11 of the ball is free to move with respect to the section 10 so that the section 11 is thus adapted to provide a follower for the packing 19. Consequently, fluid pressure will act against the follower to compress the packing body between the follower and the body section 10 of the ball for feeding the packing body outwardly into firm contact with the socket wall. The shoulder 15 will, of course, assist in this outward feeding of the packing body and owing to the presence of the shoulder a correspondingly increased area of the packing will be brought into engagement with the wall of the socket so that a sealed joint will thus be provided between the ball and socket. As the follower is pressed toward the body section 10 of the ball to compress the packing body, the core 20 of the packing will be slidably received within the recess 17 of the follower and in this connection particular attention is now directed to the fact that this core will prevent the packing body from being compressed into the registering passages 12 and 16 of the ball to either restrict or obstruct these passages. A free flow of fluid medium through the joint will thus always be had. Upon the saturation of the packing body said body will swell to itself bulge against the wall of the socket and, as in the instance of the compression of the packing body by the follower, the core 20 of the packing will, when the packing body so swells, prevent the protrusion of the packing body into the registering passages of the ball. Swelling of the packing body will result in a tendency on the part thereof to separate the sections of the ball and forcibly urge these sections into close frictional contact with the wall of the socket to further provide a sealed joint between the socket and ball. This feature is of particular advantage in that should the pressure acting against the follower be suddenly relieved, the packing body will not contract or rebound from the wall of the socket to permit leakage. Since the packing is entirely free with respect to the sections 10 and 11 of the ball it will be seen that the packing may be placed within the joint with a minimum of difficulty and in any instance where it is desired to renew the packing it will simply be necessary to disconnect the socket nut and cup when the old packing may be withdrawn and a new packing substituted therefor.

In Figure 3 of the drawings, I have shown a slight modification of the invention. In this figure the body section of the ball of the joint is indicated at 29 and the coacting cap section at 30. The cup of the socket which receives the ball is indicated at 31 and the socket nut at 32. The body section 29 of the ball is formed with a passage 33, the inner end of which is counterbored to provide a recess or socket 34. The section 30 of the ball is also formed with a passage 35 registering with the passage 33 and the inner end portion of this passage 35 is also counterbored to provide a socket or recess 36 registering with the socket 34 and of equal diameter. Interposed between the ball sections is a packing indicated as a whole at 37. This packing is formed with an annular body identical with the body 19 of the packing employed in connection with the preferred construction and possesses similar qualities. In this modified construction, an elongated non-yielding core 38 is provided for the packing body. This core is preferably formed of metal and, like the core 20 of the packing previously described, may be formed as a part of the packing at the time of original manufacture thereof or, if preferred, the packing body and core may be later assembled. The end portions of the core are slidably received one within the counterbore 34 of the body section of the ball and the other within the counterbore 36 of the section 30, space being provided for the movement of the core axially of these registering bores so that the section 30, which in the present instance as in the preferred construction provides a follower for the packing, may shift to compress the packing between the ball sections and feed the packing to the wall of the socket for providing a sealed joint between the ball and socket. By employing an elongated core, the core acts to couple the body section of the ball and follower so that the follower will be positively shifted in unison with the body section when the ball is turned to extreme angles within the socket. Otherwise, this modified form of the invention is identical with the preferred construction and further description of its details is accordingly believed unnecessary.

Having thus described the invention, what is claimed as new is:

In a flexible pipe joint, a swelling packing unit having a rigid core defining an opening through the packing and limiting the swelling of the packing in a direction tending to close said opening.

In testimony whereof I affix my signature.

WALTER C. WHITE. [L. S.]